Aug. 2, 1960 N. B. CHRISTENSEN 2,947,532
ACTUATING MECHANISM
Filed July 5, 1956 2 Sheets-Sheet 1
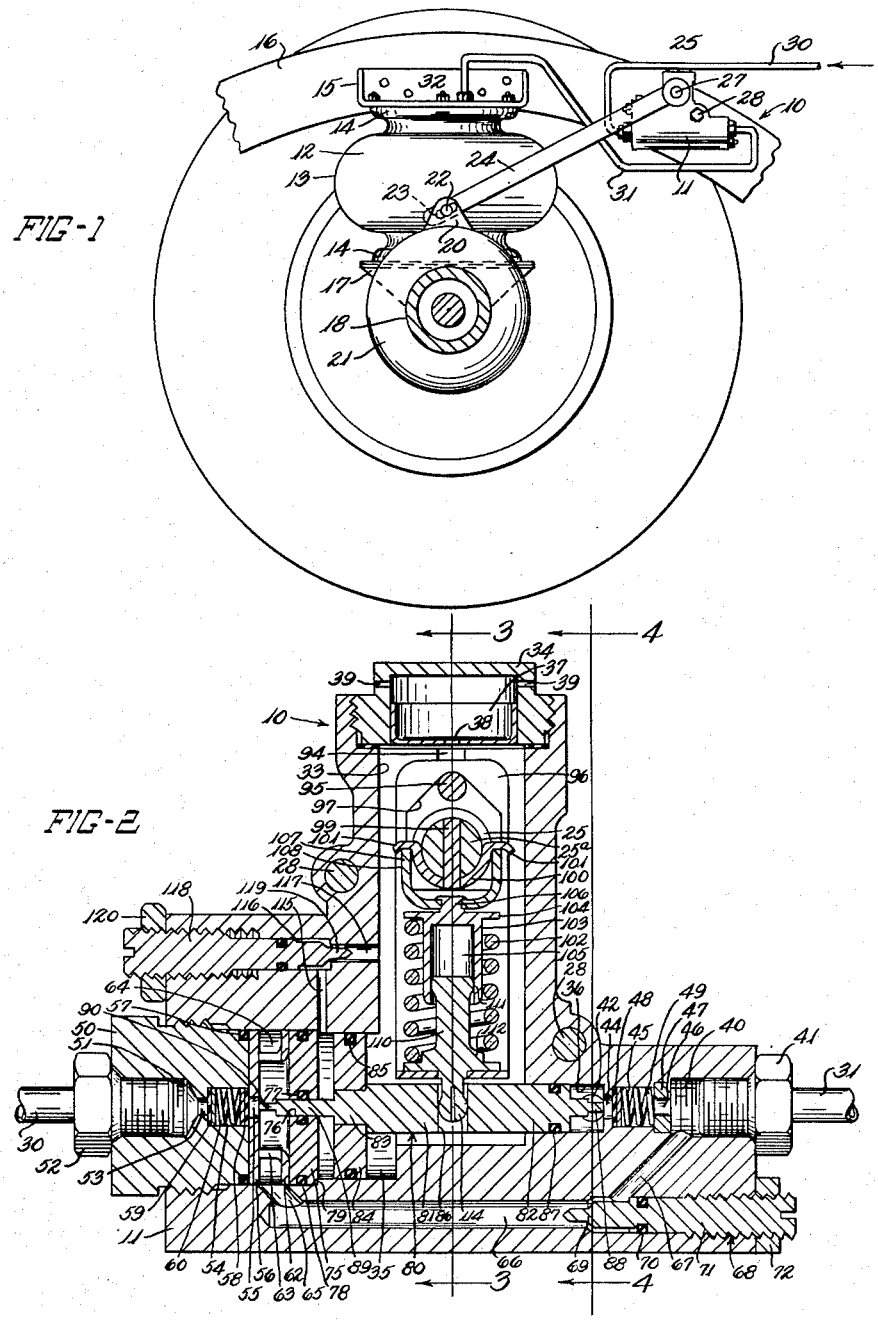
INVENTOR.
NORMAN B. CHRISTENSEN
BY
W. A. Fraser
ATTY.

Aug. 2, 1960 N. B. CHRISTENSEN 2,947,532
ACTUATING MECHANISM
Filed July 5, 1956 2 Sheets-Sheet 2

INVENTOR.
NORMAN B. CHRISTENSEN
BY W. A. Fraser
ATTY.

United States Patent Office 2,947,532
Patented Aug. 2, 1960

2,947,532
ACTUATING MECHANISM

Norman B. Christensen, North Olmsted, Ohio, assignor of one-half to Republic Manufacturing Co., Cleveland, Ohio, and one-half to The Firestone Tire & Rubber Company, Akron, Ohio, both corporations of Ohio Filed July 5, 1956, Ser. No. 596,110

5 Claims. (Cl. 267—65)

This invention relates generally to pneumatic suspension systems for vehicles. More particularly, this invention relates to an improved actuating mechanism for the control device of a pneumatic suspension system. Such control devices provide means whereby pneumatic devices, such as bellows type air springs, may be made to respond to increased or decreased vehicle loads causing a substantial change in the riding level of the vehicle, while preventing unnecessary alteration of the riding level when the vehicle road gear passes over a bump or drops into a hole, which actions only momentarily alter the load on the suspension system.

Pneumatic suspension systems, incorporating air springs interposed between the vehicle frame and road or running gear, have been slow to achieve commercial success because they have not been provided with satisfactory control devices for regulating the air cushion within the air springs to maintain a predetermined height between the road gear and frame of the vehicle. Maintaining a constant average air spring length or air cushion under variable static load conditions will provide a constant riding level for the vehicle.

A control device includes normally inactive valve assemblies which regulate the air cushion within the pneumatic devices in response to changing static load conditions. An increase in the load will compress the air spring. To restore the air spring to its initial position, a valve is opened so that air under pressure is admitted into the air spring. A decrease in load will cause the air spring to extend or raise, and therefore another valve is opened so that air is exhausted or vented from within the air spring to restore it to its initial position.

A satisfactory control device also includes suitable lost motion and time delay elements. These are necessary so that the valve assemblies will not react to supply or exhaust air as a result of normal road gear movement due to driving surface irregularities, or, until persistent changes in the static load are maintained for a predetermined period of time. The time delay feature is often referred to as "damping" and preferably is adjustable over a time range of from 1 to 20 seconds, as determined by the conditions under which the vehicle is operated.

The actuating mechanism of the control device also must not be influenced by the natural frequency of the vehicle suspension system which will probably be in the range of from 1 to 2 cycles per second.

Lastly, the actuating mechanism and control device must be unaffected by and remain operative under extremes of temperature, humidity and exposure to sand, dirt, grease, oil and water.

It is therefore an object of the invention to provide an improved control device and actuating mechanism for use in the regulation of a pneumatic suspension system.

Further, it is an object to provide an improved control device actuating mechanism which will operate the normally inactive or closed valve assemblies of a control device to regulate the air cushion within pneumatic devices in response to changing load conditions.

Still further, it is an object to provide a control device and actuating mechanism with novel and improved lost motion and time delay elements incorporated therein.

These and other objects will be apparent in view of the following detailed description of the invention considered with the attached drawings.

In the drawings:

Fig. 1 is a vertical sectional view through a vehicle axle showing in elevation a portion of the vehicle equipped with a control device and actuating mechanism according to the invention;

Fig. 2 is an enlarged section of the control device and actuating mechanism in the normal position;

Figure 3:
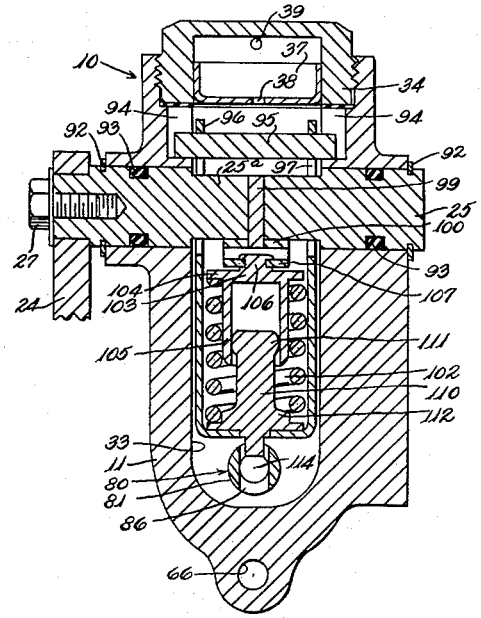
Fig. 3 is a section taken substantially on line 3—3 of Fig. 2 showing the actuating mechanism.

In the present invention a control device, indicated generally by the numeral 10, includes a housing 11 which carries the regulating valve assemblies, the damping means and the actuating mechanism which is operated by remote changes in the vehicle loading. The housing 11 is located laterally of a conventional air spring bellows 12 of multi-ply rubber and cord construction and having one or more convolutions 13. The upper end of the air spring is hermetically fastened by a suitable clamp ring 14 to the underside of a horizontal transverse member 15 constituting a portion of the vehicle frame. The member 15 is securely affixed at either end to longitudinal frame members 16. The lower end of the air spring 12 is also hermetically fastened by a similar clamp ring 14 to the upper side of a bracket 17 on the axle housing 18 of the vehicle road gear.

One mode of interposing an air spring between a vehicle frame and road gear has been shown and described. It will be understood, however, that the principles of the invention are applicable to air springs interposed in other ways between the vehicle frame and road gear. Also, only one air spring has been shown in connection with this invention, but it will be understood that the invention may be utilized with as many air springs as are required on a vehicle.

A stub flange 20, which may be located atop the vehicle differential housing 21, has a bolt 22 extending through the flange and an elongated longitudinal slot 23 formed in the lower end of an operating rod 24 so that the rod is slidably mounted at its lower end. The rod 24 is the connection through which changes in the static loading are transmitted to the actuating mechanism of the control device 10. It will be apparent that other modes of connecting the control device with the vehicle road gear, such as a flexible spring, may also be used.

The upper end of the operating rod 24 is fixed to one end of an actuating shaft 25 and secured thereon by a bolt and washer 27 (Fig. 3) for rotation in housing 11 in a manner described below. The housing 11 is preferably located above the horizontal plane of the axle and is fastened to a longitudinal frame member 16 by bolts 28 extending through the housing.

Air, from a source under pressure (not shown), is supplied to the control device 10 by suitable piping 30. The control device is connected by suitable piping 31 to an air spring fitting 32, which extends through the frame member 15 into the interior of the air spring. The piping 31 is the conduit for supplying air to and exhausting air from the air spring 12, through the control device 10, as referred to later.

The housing 11 of the control device 10 contains various elements of the actuating mechanism, with the exception of the operating rod 24 and its associated linkage; the various conduits interiorly of the housing for the passage of supply and exhaust air; the valves controlling such conduits; and, the hydraulic damping elements retarding the operation of the valves.

As shown in Figs. 2 and 3, the housing 11 is provided with a substantially vertical bore 33. At its upper end, the bore 33 is closed by a removable threaded cap 34. At its lower end, the vertical bore communicates with a large circular horizontal bore 35 extending laterally to one end of the housing and a smaller circular horizontal bore 36 extending laterally toward but terminating short of the other end of the housing. As referred to below, the vertical bore 33 and the inner portion of the bore 35 are filled with a suitable fluid such as hydraulic brake fluid. The fluid volume within the housing is maintained substantially constant by a breather cup 37 fitted within the cap 34 and communicating with the bore 33 through a passage 38 and with the atmosphere through small vent passages 39.

Figure 4:
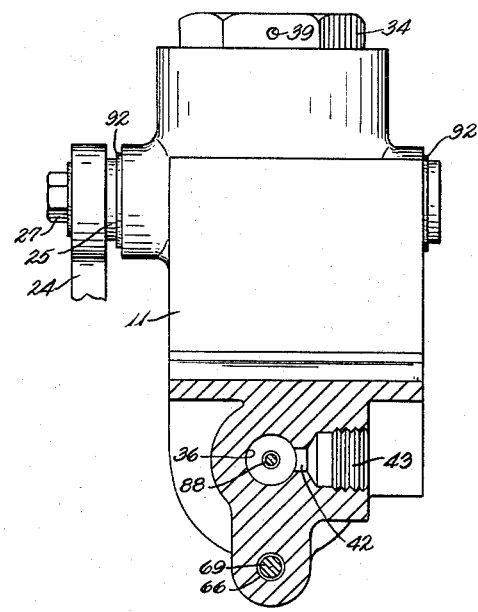
Fig. 4 is a section taken substantially on line 4—4 of Fig. 2 through the control device housing; and, Fig. 5 is a view, similar to Fig. 2, showing the actuating mechanism in the air supply condition.

At the end of the housing toward which the smaller bore 36 is directed is a two-way bellows port 40 having a fitting 41, connected to the piping 31, threaded therein. Referring to Fig. 4, at approximately right angles to the bellows port, and communicating with the outer end of the bore 36 through a short passage 42, is an exhaust port 43. The bore 36 communicates with the bellows port 40 through a small diameter orifice 44 and an enlarged diameter valve chamber 45, both in the housing 11, and another small diameter orifice 46 in a valve spring seat plug 47 fitted in the inner end of the bellows port 40. To control passage of exhaust air from the bellows port as referred to below, into the bore 36, a valve 48 is seated at the inner end of chamber 45 normally closing orifice 44. Valve 48 is in the form of a flat, reinforced air impermeable disc, and a small coil spring 49, bearing between the valve and the plug 47 has a normal bias tending to keep the valve seated. Valve 48 is suitably shaped to cover orifice 44 when seated, and may be square, hexagonal, star shaped, round, or any other shape that will permit the passage of air around the valve.

Threaded into the outer end of the larger bore 35 is a circular plug 50 having a supply port 51 therein. A fitting 52, connected to the piping 30 communicating with the air source, is threaded into the port 51. The supply port communicates with the interior of the housing 11 through a small diameter orifice 53, an enlarged diameter valve chamber 54, and a small diameter orifice 55 in a circular end plate 56. The end plate is tightly fitted within bore 35 adjacent the inner end of the plug 50. An O ring 57 is carried on the outer periphery of the plug 50 and seated against the end plate to provide a fluid tight seal.

To control passage of compressed air from the piping 30 to the bellows port 40, and thence to the air spring as referred to below, a valve 58 is seated at the inner end of chamber 54 normally closing orifice 55. To limit loss of air pressure from the air spring in the event that the pressure in the air piping drops below that of the air spring, a check valve 59 normally closing orifice 53 is seated at the outer end of chamber 54. The valves 58 and 59 are similar to valve 48 and a small coil spring 60 bearing between the valves has a normal bias tending to keep them seated.

Inwardly of the end plate 56 is a flange-like member 62 having its radial portion tightly fitted within bore 36. The axial portion of the member 62 extends toward and is in abutting contact with the end plate. The axial portion is also provided with a series of radial slots 63 so that compressed air entering bore 35 will pass into an annular chamber or passage 64 formed between the axial portion of member 62 and the wall of bore 36. Passage 64 communicates with a short passage 65, in the housing beneath bore 35, leading to one end of an elongated passageway 66 extending transversely of the housing. The other end of passage 66 is slightly enlarged and communicates with a diagonal passage 67 that opens into the bellows port 40.

Beneath the bellows port 40, a regulating needle valve, indicated generally by the numeral 68, is inserted within the enlarged end of passage 66. The needle valve 68 includes a tapered stem 69, an O ring 70 surrounding the stem to provide an airtight seal, a threaded body portion 71 and an adjusting nut 72. Rotation of the body portion 71 will cause the tapered stem 69 to be positioned within passage 66 so as to either increase or decrease the amount of air per unit time which will pass from the supply line 30, through the several orifices, chambers and passages, to the bellows port 40 and thence through piping 31 to the air spring.

As described elsewhere, the inner portion of bore 35 is fluid filled. The outer portion of bore 35 is sealed off from the fluid by a ring 75 having an axial bore 76 therethrough. O rings 77 and 78, on the outer periphery of the ring and around the axial bore, ensure a fluid tight seal. The ring 75 is seated between a shoulder 79 in the bore and the flange-like member 62.

The valves 48 and 58 are selectively unseated, to exhaust air from or admit air to the air spring 12, by the movement interiorly of the housing 11 of a valve actuating plunger, indicated generally by the numeral 80. The plunger 80 includes a central rod-like portion 81 extending transversely across the lower end of the vertical bore 33 and having an end 82 slidably received in the bore 36. Within bore 35, the other end 83 is supported by a piston 84. The piston 84 fulfills a damping function described elsewhere in detail and is fitted with a peripheral O ring 85 providing a fluid tight seal. Approximately midway of the vertical bore 33, the central portion 81 of the plunger has a small vertical bore 86 for operatively connecting the plunger with the actuating mechanism described below.

The plunger end 82 is provided with an O ring 87 to provide a seal against the entrance into bore 36 of the hydraulic fluid in bores 33 and 35. Extending outwardly of the end 82 is a valve operating stem 88 adapted to enter orifice 44 and unseat valve 48. Extending outwardly of the end 83, through the bore 76 in the ring 75, is a reduced diameter rod portion 89. Extending outwardly of the rod portion is a valve operating stem 90 adapted to enter orifice 55 and unseat valve 58.

Axial movement of the plunger 80, so as to open valves 48 or 58, is accomplished by the improved actuating mechanism located within the vertical bore 33 and operated by rotation of the shaft 25. As shown in Fig. 3, the round ends of the actuating shaft are journaled in the housing 11 and maintained in position by snap rings 92. Suitable O rings 93 provide a fluid-tight seal. Between its end, the medial portion 25a of the actuating shaft is reduced in diameter. Above the shaft and below the cap 34 in the wall of bore 33 are a pair of opposed vertical slots 94 supporting the ends of an actuating mechanism pivot bar 95.

Figure 5:
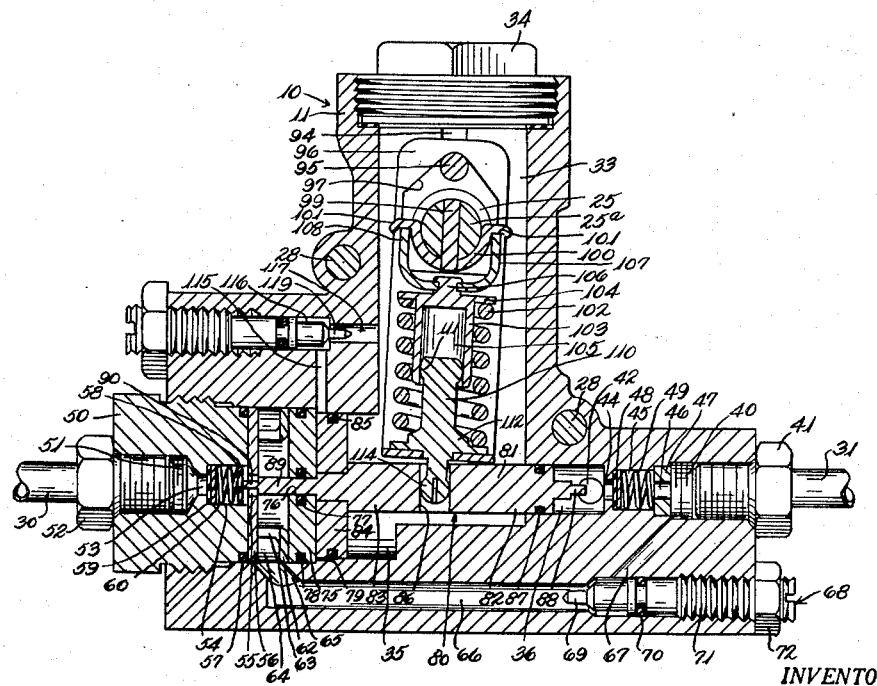

The pivot bar 95 supports and positions within the fluid filled vertical bore 33, a strap or hanger member 96. The strap member 96 is generally U-shaped in cross-section (Fig. 3) and is provided at its upper ends with identical slots 97 through which the pivot bar 95 and the shaft 25 extend. Referring to Figs. 2 and 5, a short pin 99 extends downwardly through portion 25a of the actuating shaft. The pin 99 is preferably flush with the upper surface of the shaft but protrudes a slight distance below the under surface of the shaft and is rigidly inserted in a yoke 100. The yoke 100 conforms generally with the under surface of shaft portion 25a and has opposed lateral ears 101.

Between the yoke 100 and the lower end of the strap 96 is a coiled compression spring 102 which provides a yieldable torque connection between the shaft 25 and the plunger 80 in the following manner: Inserted in the upper end of the spring 102 is a thimble or plug 103 having a spring engaging flange 104 and a hollow body portion 105 extending downward axially of the spring 102. Securely attached to the upper portion 106 of the thimble is a second strap member 107, also generally U-shaped in cross-section (Figs. 2 and 5), having upwardly extending legs 108 maintained in contact with the yoke ears 101 by the spring 102.

Inserted axially of the lower end of the coil spring 102 is a plunger actuating lever 110. The upper end of the lever 110 is preferably rounded as at 111, and has a diameter substantially the same as the internal diameter of the hollow body portion 105 of the thimble 103, into which the upper end 111 is inserted. The medial portion 112 of the lever is flanged so as to seat the lower end of the spring 102. Extending through the lower end of the strap 96, the lever 110 has a preferably slotted ball formation 114 fitting within the vertical bore 86 of the plunger 80.

As described in detail below, rotation of the shaft 25 is transmitted through the several elements of the actuating mechanism to the plunger 80. Movement of the plunger 80 is damped or retarded by the hydraulic fluid within the housing 11 and the piston 84. Referring to Fig. 2, extending upwardly from bore 35, between the ring 75 and the piston, is a vertical fluid passage 115. The passage 115 opens into a horizontal fluid chamber 116. Opening inwardly from the chamber 116, into the vertical bore 33, is a lateral passage 117. Fitted in the outer end of a chamber 116 is a needle valve 118. The needle valve has a stem portion 119 which is located within the inner end of the lateral passage by an adjusting nut 120, so as to vary the amount of fluid passing per unit time into or from the vertical bore 33.

The operation of the control device 10 is as follows:

Assume that the normal static load on the vehicle suspension requires that the air spring be inflated to a pressure of about 50 p.s.i. At this pressure, the control device will be as shown in Fig. 2. That is, valve 48 will be seated against orifice 44 by spring 49, and valves 58 and 59 will be seated against orifices 55 and 53, respectively, by spring 60.

Now then, assume that the static load is increased, for example, by adding merchandise or passengers to the vehicle. As the load is increased, the upper frame members 15 and 16 move downwardly toward the axle housing 18, causing the air spring 12 to contract. During this downward movement of the upper frame members, the control device 10 also moves downwardly. Such downward movement of the control device causes the actuating shaft 25 to be turned by the operating rod 24, the lower end of which is slidably attached to the differential housing 21, to permit sliding movement of the rod as the control device moves downwardly. That is, as the distance between the member 15 and the axle housing 18 decreases, the rod 24 will cause the shaft 25 to be rotated within the bore 33.

As viewed in Fig. 1, an increased load will cause the shaft 25 to rotate in a clockwise direction to supply air under pressure into the air spring 12. As shaft 25 is turned clockwise on its axis from its normal position (Fig. 3), the pin 99 will cause the yoke 100 to follow. Rotation of the yoke will cause the strap 107 to also follow or oscillate. As the strap 107 oscillates toward the position shown in Fig. 5, the thimble 103 will be displaced about the axis of rotation of the shaft 25. Displacement of the thimble produces an immediate and predetermined torque in the spring 102 with a resulting application of an axial torque to the lever 110 carried by the larger strap 96 so that the plunger 80 is displaced axially to the left to the position shown in Fig. 5.

The axial movement of the plunger 80 is damped or retarded by the piston 84. As the piston is moved to decrease the volume of the fluid-filled chamber 35, fluid is transferred through passage 115 into chamber 116, past the needle valve stem 119, and then through passage 117 into the vertical bore 33. The speed or rate of such transfer, and thus the speed of the horizontal movement of the plunger 80, is thus determined by the diameter of the fluid passages and controlled by adjustment of the needle valve 118.

As the plunger 80 moves to the left in Fig. 5, so does the operating stem 90 causing valve 58 to be unseated, valve 59 also being unseated by the pressure of the air in the supply line 30, and allowing additional air to enter through orifice 55 and then through the various passages to the air spring 12. This additional air must be under a greater pressure than the air already in the air spring 12, and will extend the air spring to its initial position.

As the air spring extends, the frame members 15 and 16 move upwardly from the axle housing 18 causing shaft 25 to be turned by the rod 24 in a counterclockwise direction as viewed in Fig. 5. As the shaft begins to assume the normal position shown in Fig. 2, the yoke 100 will return the strap 107 and thimble 103 to the normal position, which action releases the torque applied to the partially compressed spring 102 which then extends and returns the plunger 80 to its normal position. This action reverses the flow of hydraulic fluid past the needle valve 118 and allows spring 60 to close valve 58, stopping the flow of additional air and maintaining the original position of the air spring.

If the static load on the vehicle suspension is decreased, the frame members 15 and 16 move upwardly away from the axle housing 18, causing the air spring to extend. During this upward movement of the frame members, the control device 10 also moves upwardly, causing shaft 25 to be turned by rod 24, in a counterclockwise direction as viewed in Fig. 3, said rod sliding with respect to the bolt 22 as the device 10 moves upwardly.

As the shaft 25 is turned counterclockwise on its axis, the ensuing action is similar but in the opposite direction to that described above. That is, plunger 80 is moved axially to the right as viewed in Fig. 2. This displaces fluid from the vertical bore 33, through the passages 117 and 115, and past the needle valve in chamber 116, to the bore 35.

As the plunger moves to the right, so does the stem 88 causing valve 48 to be unseated permitting air to pass from the air spring into bore 36, through passage 42 to the exhaust port 43 and the atmosphere. The exhaust of air from within the air spring will contract the air spring to its initial position. As the air spring contracts, the frame members 15 and 16 move downwardly toward the axle housing 18 causing rod 24 to return shaft 25 to its normal position. This returns plunger 80 to its normal position, withdrawing the plunger stem 88 from orifice 44 and allowing spring 49 to close valve 48, stopping the exhaust of air and maintaining the original position of the air spring.

When a vehicle equipped with a suspension system according to the invention is driven over rough roads with no change in the static loading, the vehicle wheels tends to move up and down over bumps and into holes in the road. This causes the shaft 25 to be quickly turned in either direction as the case may be. However, a quick turning of shaft 25 will not cause the various components of the control device 10 to react to supply or exhaust air because of the compressibility and flexibility inherent in the coil spring 102, the slight pivoting permitted by the rounded upper end 111 of the lever 110 with the hollow body portion 105 of the thimble 103 and, predominantly, the damping or time delay effect of the piston 84 upon movement of the plunger 80. Thus, the admission of additional air into, or the exhaust of air from the air spring will not occur until a force is maintained in one direction for a predetermined period of time which is selected by the position of the needle valve 116.

A shut off valve (not shown) can be provided in the air spring line 31 so that a mechanic can shut off the line when raising the vehicle by a bumper jack to remove a tire.

While a preferred embodiment of the invention has been shown and described, it will be understood that changes and modifications may be made therein without departing from the spirit of the invention or the scope of the subjoined claims.

What is claimed is:

1. Control means adapted for regulation of the supply and exhaust of air to and from an expansible bellows for a vehicle suspension system to maintain a predetermined height between the road gear and frame of the vehicle, comprising: a housing having a normally vertical bore, a first horizontal bore communicating with said vertical bore, and a second smaller diameter bore axially aligned with said first bore; a plug in said first bore; an air supply port opening exteriorly of said housing through said plug; a sealing member inwardly of said plug defining an air chamber within said first bore; a valve within said plug blocking passage of air between said supply port and air chamber; a two-way port adapted for communication with a bellows opening exteriorly of said second bore; a valve within said housing blocking passage of air between said two-way port and second bore; an exhaust port opening exteriorly of said second bore; a passageway through said housing connecting said air chamber with said two-way port; a plunger fitted in said second bore in sealed engagement therewith and slidably extending transversely of said vertical bore through said first bore and sealing member to selectively actuate said valves; a shaft extending transversely of said vertical bore adapted for rotation by relative movement between the road gear and frame of the vehicle; a motion transmitting means within said vertical bore operatively connecting said shaft with said plunger; and, damping means associated with said plunger opposing movement thereof for a predetermined time.

2. Control means adapted for regulation of the supply and exhaust of air to and from an expansible bellows for a vehicle suspension system to maintain a predetermined height between the road gear and frame of the vehicle, comprising: a housing having a normally vertical substantially fluid filled bore, a first horizontal bore communicating with said vertical bore, and a second smaller diameter bore axially aligned with said first bore; a plug in said first bore; an air supply port opening exteriorly of said housing through said plug; a sealing member inwardly of said plug defining an air chamber within said first bore; a valve within said plug blocking passage of air between said supply port and air chamber; a two-way port adapted for communication with a bellows opening exteriorly of said second bore; a valve within said housing blocking passage of air between said two-way port and second bore; an exhaust port opening exteriorly of said second bore; a passageway through said housing connecting said air chamber with said two-way port; a plunger fitted in said second bore in sealed engagement therewith and slidably extending transversely of said vertical bore through said first bore and sealing member to selectively actuate said valves; a piston fitted transversely of said plunger within said first bore; a fluid transfer passage through said housing opening outwardly of said first bore between said sealing member and piston and communicating with said vertical bore; adjustable means for regulating the size of said transfer passage; a shaft extending transversely of said vertical bore adapted for rotation by relative movement between the road gear and frame of the vehicle; and a motion transmitting means within said vertical bore operatively connecting said shaft with said plunger; the rate of axial movement of said plunger in response to rotation of said shaft being regulated by the size of said transfer passage.

3. Control means adapted for regulation of the supply and exhaust of air to and from an expansible bellows for a vehicle suspension system to maintain a predetermined height between the road gear and frame of the vehicle, comprising, a housing having a horizontal bore, opposed valves at the ends of said bore for controlling said supply and exhaust of air, a plunger movable longitudinally within said bore to selectively actuate said valves, a vertical bore intersecting said horizontal bore at substantially a right angle, a shaft extending transversely of said vertical bore adapted for rotation by relative movement between the road gear and frame of the vehicle, a strap member extending longitudinally of said vertical bore independently of said shaft, a lever carried by said strap member engaging said plunger, and a non-rigid means transmitting torque from said shaft to said lever.

4. Control means adapted for regulation of the supply and exhaust of air to and from an expansible bellows for a vehicle suspension system to maintain a predetermined height between the road gear and frame of the vehicle, comprising, a housing having a horizontal bore, opposed valves at the ends of said bore for controlling said supply and exhaust of air, a plunger movable longitudinally within said bore to selectively actuate said valves, a vertical bore intersecting said horizontal bore at substantially a right angle, a shaft extending transversely of said vertical bore adapted for rotation by relative movement between the road gear and frame of the vehicle, a U-shaped strap member pivotally mounted above said shaft and having legs extending longitudinally of said vertical bore, a lever carried by said strap member engaging said plunger, a yoke affixed to said shaft between the legs of said strap member, a second strap member depending from said yoke, a thimble connected to said second strap member and engaging the upper end of said lever and a coiled spring extending between said thimble and said lever whereby torque is transmitted from said shaft to said lever.

5. In combination with a device for controlling the passage of a fluid under pressure, said device having opposed valves selectively actuated by a reciprocable plunger, a plunger actuating mechanism comprising, a rotatable shaft, a U-shaped strap member pivotally mounted above said shaft and having legs straddling said shaft, a lever carried by said strap member engaging said plunger, a yoke affixed to said shaft between the legs of said strap member, a second strap member depending from said yoke, a thimble connected to said second strap member and engaging the upper end of said lever, and a coiled spring extending between said thimble and said lever whereby torque is transmitted from said shaft to said lever.

References Cited in the file of this patent
UNITED STATES PATENTS

| | | |
|---|---|---|
| 2,075,600 | Baker | Mar. 30, 1937 |
| 2,129,084 | Dorman | Sept. 6, 1938 |
| 2,339,378 | Clench et al. | Jan. 18, 1944 |
| 2,670,201 | Rossman | Feb. 23, 1954 |